N. DU BRUL.
COMBINED FLOUR AND MEAL SIFTER.
No. 254,434. Patented Feb. 28, 1882.
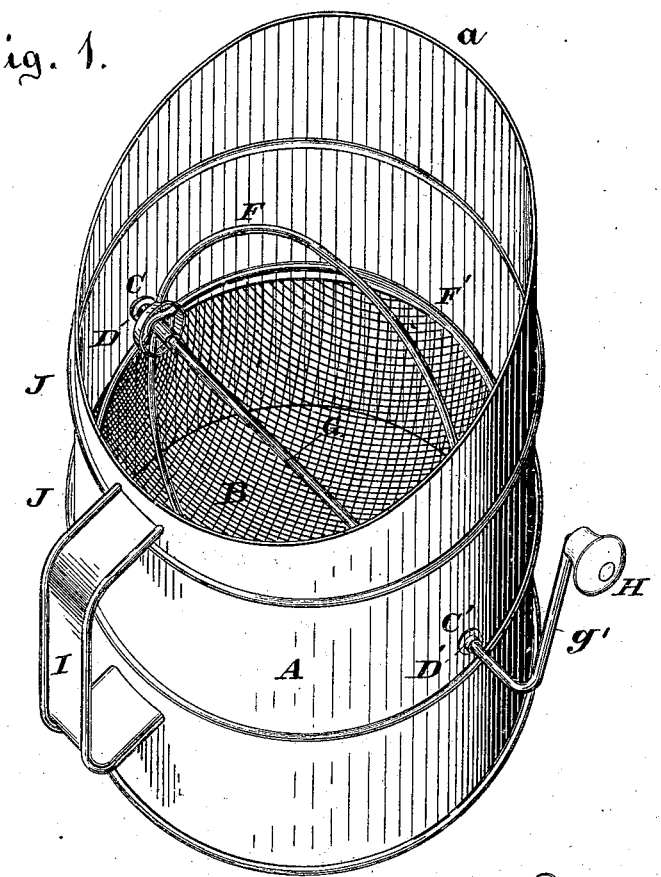
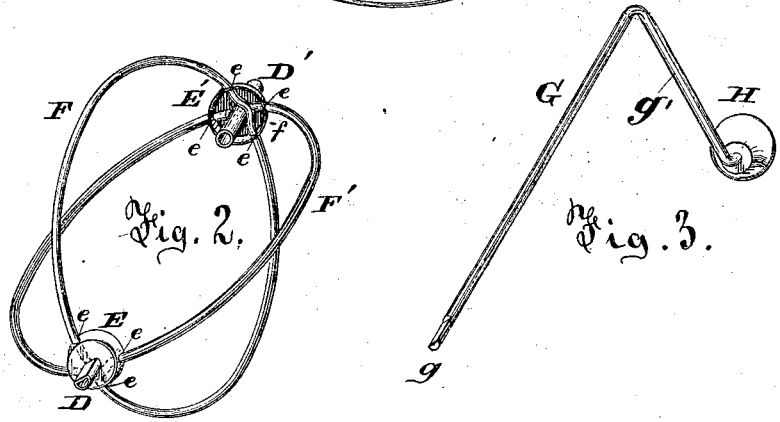
Attest
Walter Knight
Leonard Knight
Inventor.
Napoleon DuBrul
By Knight Bros. Attys

UNITED STATES PATENT OFFICE.

NAPOLEON DU BRUL, OF CINCINNATI, OHIO, ASSIGNOR TO BRAINERD T. SMITH, OF COVINGTON, KENTUCKY.

COMBINED FLOUR AND MEAL SIFTER.

SPECIFICATION forming part of Letters Patent No. 254,434, dated February 28, 1882.

Application filed December 10, 1879.

*To all whom it may concern:*

Be it known that I, NAPOLEON DU BRUL, of Cincinnati, in the county of Hamilton and State of Ohio, have invented a new and useful Improvement in Flour-Sifters, of which the following is a specification.

My invention relates to improvements in those combined flour and meal sifters in which a circular stirrer, beater, or agitator revolves on an axis coincident with one of its diameters and nearly in contact with a hemispherical sieve beneath it.

My invention consists in improvements in the agitator, which renders it more effective and durable and of more ready removal and insertion. For these purposes the hubs of the agitator comprise short tubes or sleeves whose only connection with one another is by the flexible wires of the agitator. These sleeves have collars, to which the wires of the agitator are connected by insertion and soldering, each wire being bent at mid-length to pass half around the sleeve, its ends being soldered to the collar of the opposite sleeve. Both sleeves revolve within bushed or eyeleted orifices in the sifter-tube and receive the handle-shaft, the sleeve which receives the end of the shaft being non-circular interiorly to receive the correspondingly-formed extremity of the said shaft, said non-circular extremity being formed by filing or cutting one or more flat facets on that extremity of the round wire of which the said shaft is composed. The other end of the handle-shaft extends outside of the sifter-tube, and is doubly bent to form a handle or crank, by which the agitator is turned.

Projecting exteriorly from the sifter-tube, about one-fourth of its circuit to the left of the shaft-handle, is the sifter-handle, which being grasped enables the operator to hold the sifter in proper position with one hand while rotating the agitator with the other hand.

In the accompanying drawings, Figure 1 is a perspective view of a flour-sifter embodying my invention. Figs. 2 and 3 show respectively the agitator-frame and the handle detached.

A represents a cylindrical tube open at both ends. Near the lower end of the tube is secured a sieve or porous diaphragm, B, preferably of wire-gauze, and of such concave form on its upper surface as to correspond with the convex outline of the agitator.

Coincident with a diameter of the sieve are two orifices in the sifter-tube A, preferably bushed or eyeleted, as at C C', to afford journal-bearings for two short sleeves or hollow journals, D D', which, with collars E E', constitute the hubs of my stirrer. The said collars are preferably saucer-formed, as represented, and are pierced to receive the two wire rings F F', that constitute the beaters proper of my stirrer or agitator. Each agitator-wire is formed into a circular ring or annulus, and is further sharply bent, *f*, at its mid-length to pass half around the hub's sleeve, in the manner shown, and has its ends inserted through holes *e* in the collars and brought into contact with the similarly-bent other wire in the opposite hub, which being done the wires with said collars and hub-sleeves are soldered fast. One hub-sleeve, D, is of semicircular or other non-circular interior, to fit the correspondingly-formed non-circular extremity *g* of the handle-shaft G. The other hub-sleeve, D', is circular, to fit the portion of the handle-shaft which occupies it. Outside of the sifter-tube the shaft is bent laterally and again outwardly to form a crank-handle, *g'*, to receive a knob, H, constituting the handle. The flexibility of the agitator and its constituting the sole connection of the hubs enables it to be sprung inwardly, so that by simultaneous withdrawal of the shaft both agitator and shaft can be quickly and easily removed from the sifter-tube and as readily replaced by a reversal of these actions, the elasticity of the rings serving to restore and retain the said rings to their places in the orifices C C' and the collars E E' to contact with the inner walls of said orifices, the shaft G after insertion being retained in place by reason of its tight fit within the sleeves D D'.

Projecting externally from the sifter-tube, about one-quarter of its circuit to the left of the agitator-handle, is a looped handle, I, to enable the user to securely grasp the sifter with one hand while operating the agitator with the other hand.

Circumferential beads J in the sifter-tube serve to stiffen it and to keep it in shape, and may further serve as measure-marks. For example, the two beads may indicate respectively one and two pints, and the top of the sifter even full three pints.

I am aware that agitator-frames have been made with beater-wires whose ends have been secured to the ends of a square sleeve or hub extending across the frame, the agitator being secured in operative position by the shaft passing through it. This therefore I do not claim.

Having thus described my invention, the following is what I claim as new therein and desire to secure by Letters Patent:

1. In a sifter, the combination, with body A, hemispherical sieve B, and a suitable shaft, of the agitator, consisting of wires F F', collars E E', and short sleeves D D', projecting from the ends of the frame and journaled in the said body, as set forth.

2. The wire shaft G, having crank-handle $g'$ and non-circular extremity $g$, in combination with the agitator, consisting of wires F F', collars E E', and short sleeves D D', the inner sleeve, D, being formed non-circular interiorly, as set forth.

3. The combination of wire circles F F', having bent portions $f$ at their mid-length, collars E E', having holes $e\ e$, adapted to receive the ends of the circular wires, the short sleeves D D', and shaft G, as set forth.

In testimony of which invention I hereunto set my hand.

NAPOLEON DU BRUL.

Witnesses:
L. H. BOND,
GEO. H. KNIGHT.